United States Patent
Kikuchi et al.

(10) Patent No.: US 9,941,802 B2
(45) Date of Patent: Apr. 10, 2018

(54) INSULATED DC/DC CONVERTER

(71) Applicant: ROHM CO., LTD., Ukyo-ku, Kyoto (JP)

(72) Inventors: Hiroki Kikuchi, Kyoto (JP); Junichi Hagino, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/485,920

(22) Filed: Apr. 12, 2017

(65) Prior Publication Data

US 2017/0302186 A1     Oct. 19, 2017

(30) Foreign Application Priority Data

Apr. 13, 2016  (JP) ................................. 2016-080349

(51) Int. Cl.
  *H02M 3/335*    (2006.01)
  *H02M 1/08*     (2006.01)
  *H02M 1/00*     (2006.01)

(52) U.S. Cl.
  CPC ......... *H02M 3/33523* (2013.01); *H02M 1/08* (2013.01); *H02M 2001/0009* (2013.01)

(58) Field of Classification Search
  CPC .. H02M 3/315; H02M 3/335; H02M 3/33507; H02M 3/33538; H02M 3/33523; H02M 3/33546; H02M 3/3155; H02M 7/48; H02M 7/515
  USPC .. 363/20, 21.01, 21.04, 21.07, 21.12, 21.15, 363/95, 97, 131
  See application file for complete search history.

(56) References Cited

U.S. PATENT DOCUMENTS

| | | | | |
|---|---|---|---|---|
| 2007/0019343 | A1* | 1/2007 | Barbehenn | H02H 7/1227 361/18 |
| 2012/0314456 | A1* | 12/2012 | Lanni | H02M 1/4258 363/21.02 |
| 2014/0247627 | A1* | 9/2014 | Louvel | H02M 3/33592 363/21.03 |
| 2016/0036339 | A1* | 2/2016 | Kikuchi | H02M 3/33592 363/21.14 |
| 2016/0111963 | A1* | 4/2016 | Oyama | H02M 3/33523 363/21.15 |

(Continued)

FOREIGN PATENT DOCUMENTS

JP     2003164145 A    6/2003

*Primary Examiner* — Adolf Berhane
(74) *Attorney, Agent, or Firm* — Cantor Colburn LLP

(57) ABSTRACT

A primary-side controller comprises a feedback (FB) terminal coupled to a light-receiving element of a photocoupler so as to receive a feedback signal from the photocoupler, and a current detection (CS) terminal that receives a current detection signal that corresponds to a voltage drop across a sense resistor $R_S$. The primary-side controller includes a current mode modulator that generates a control pulse based on the voltage at the FB terminal and the voltage at the CS terminal. The primary-side controller is configured to be switchable between a normal mode and a burst mode. When the electrical state of the DC/DC converter satisfies a predetermined condition, a burst mode adjustment circuit inhibits transition to the burst mode, or otherwise forces transition from the burst mode to the normal mode.

18 Claims, 13 Drawing Sheets

(56) References Cited

U.S. PATENT DOCUMENTS

| | | | |
|---|---|---|---|
| 2016/0181935 A1* | 6/2016 | Kikuchi | H02M 3/33592 363/21.14 |
| 2016/0261202 A1* | 9/2016 | Kikuchi | H02M 3/33523 |
| 2016/0261203 A1* | 9/2016 | Kikuchi | H02M 3/33523 |
| 2016/0261204 A1* | 9/2016 | Kikuchi | H02M 3/33523 |
| 2016/0308452 A1* | 10/2016 | Motoki | H02M 3/33523 |
| 2017/0033703 A1* | 2/2017 | Kikuchi | H02M 3/33592 |
| 2017/0040904 A1* | 2/2017 | Kikuchi | H02M 1/08 |
| 2017/0279363 A1* | 9/2017 | Hagino | H02M 3/33523 |
| 2017/0302186 A1* | 10/2017 | Kikuchi | H02M 3/33523 |

\* cited by examiner

INSULATED DC/DC CONVERTER

CROSS-REFERENCE TO RELATED APPLICATIONS

This application is based upon and claims the benefit of priority from the prior Japanese Patent Application No. 2016-080349, filed Apr. 13, 2016, the entire contents of which are incorporated herein by reference.

BACKGROUND OF THE INVENTION

Field of the Invention

The present invention relates to an insulated DC/DC converter.

Description of the Related Art

Various kinds of power supply circuits such as AC/DC converters or the like employ an insulated DC/DC converter, and more specifically, a flyback DC/DC converter or a forward DC/DC converter. FIG. 1 is a circuit diagram showing an AC/DC converter 100r including a diode rectification flyback converter 200r.

The main components of an AC/DC converter 100r include a fuse 102, an input capacitor Ci, a filter 104, a diode rectifier circuit 106, a smoothing capacitor Cs, and a flyback converter 200r.

A commercial AC voltage $V_{AC}$ is input to the filter 104 via the fuse 102 and the input capacitor Ci. The filter 104 removes noise from the commercial AC voltage $V_{AC}$. The diode rectifier circuit 106 is configured as a diode bridge circuit that performs full-wave rectification of the commercial AC voltage $V_{AC}$. The output of the diode rectifier circuit 106 is smoothed by the smoothing capacitor Cs, thereby converting the commercial AC voltage $V_{AC}$ into a DC voltage $V_{IN}$.

The insulated flyback converter 200r receives the DC voltage $V_{IN}$ at its input terminal P1, and steps down the DC voltage $V_{IN}$ thus received, so as to supply an output voltage $V_{OUT}$ thus stabilized to a target value to a load (not shown) coupled to an output terminal P2.

A transformer T1 is arranged such that its primary winding W1 is coupled to a switching transistor M1, and such that its secondary winding W2 is coupled to a rectifier diode D1. A sense resistor $R_S$ is arranged in series with the switching transistor M1. An output capacitor C1 is coupled to the output terminal P2. A feedback circuit 206 drives a light-emitting element of a photocoupler 204 using a current that corresponds to the difference between the output voltage $V_{OUT}$ and the target voltage $V_{OUT(REF)}$ thereof. A feedback current $I_{FB}$ flows through a light-receiving element of the photocoupler 204 according to this difference.

The rectifier diode D2 and the smoothing capacitor C2, together with an auxiliary winding W3 of the transformer T1, form a power supply circuit 208. The power supply voltage $V_{CC}$ generated by the power supply circuit 208 is supplied to a power supply (VCC) terminal of the a primary-side controller 300r.

A feedback voltage $V_{FB}$ occurs at an FB (feedback) terminal of the primary-side controller 300 according to the feedback current $I_{FB}$. Furthermore, the primary-side controller 300 receives, as a feedback signal, at its CS (current detection) terminal, a current detection signal $V_{CS}$ that is proportional to a primary current $I_P$ that flows through the switching transistor M1.

The primary-side controller 300r includes a peak current mode modulator. The primary-side controller 300r generates a pulse signal $S_{OUT}$ having a duty ratio (or otherwise frequency) that corresponds to the feedback voltage $V_{FB}$ and the current detection signal $V_{CS}$, so as to drive the switching transistor M1 coupled to its output (OUT) terminal.

The secondary winding W2 of the transformer T1 is coupled to a synchronous rectification transistor M2. A synchronous rectification controller 400 switches on and off the synchronous rectification transistor M2 in synchronization with the switching operation of the switching transistor M1.

FIG. 2 is a circuit diagram showing a configuration of the primary-side controller 300r investigated by the present inventors. The primary-side controller 300r includes a pulse modulator 10, a driver 20, a blanking circuit 40, a burst control circuit 50, and a voltage dividing circuit 80. The voltage dividing circuit 80 divides the feedback voltage $V_{FB}$ with a predetermined dividing ratio (for example, by ¼). The dividing ratio is determined so as to allow sufficient electric power to be supplied to a load even in a heavy load state. The voltage dividing circuit 80 may be omitted.

The blanking circuit 40 is provided in order to remove noise from the current detection signal $V_{CS}$. Specifically, the blanking circuit 40 masks the detection signal $V_{CS}$ for a predetermined period of time immediately after the switching transistor M1 is turned on. The blanking circuit 40 may be omitted.

The pulse modulator 10 generates a pulse signal $S_{PWM}$ based on the current detection signal $V_{CS}$ input to the blanking circuit 40 and the feedback signal $V_{FB}'$ divided by the voltage dividing circuit 80. The pulse modulator 10 includes a set signal generating unit 12, a reset signal generating unit 14, and a flip-flop 16. The set signal generating unit 12 includes an oscillator. The set signal generating unit 12 generates a set signal $S_{SET}$ that is asserted (set to the high level, for example) with a predetermined period, which is input to the set signal (S) of the flip-flop 16. The reset signal generating unit 14 includes a comparator that asserts (set to the high level) a reset signal $S_{RESET}$ when the current detection signal $V_{CS}$ reaches the feedback voltage $V_{FB}'$, which is output to the reset terminal (R) of the flip-flop 16. The pulse signal $S_{PWM}$, which is the output of the flip-flop 16, is set to the on level (high level) every time the set signal $S_{SET}$ is asserted. Furthermore, the pulse signal $S_{PWM}$ transits to the off level every time the reset signal $S_{RESET}$ is asserted. The driver 20 switches on and off the switching transistor M1 according to the pulse signal $S_{PWM}$.

In a case in which a microcomputer or the like is coupled as a load to the output terminal P2 of the flyback converter 200r, when the microcomputer transits to a standby mode (sleep state), the output current of the flyback converter 200r becomes very small (light load state).

In order to reduce the power consumption so as to provide high efficiency in such a light load state, the flyback converter 200r instructs the switching transistor M1 to perform intermittent operation (burst operation). Specifically, the switching transistor M1 is alternately and repeatedly switched between a switching period in which the switching transistor M1 performs a switching operation and a suspension period in which the switching transistor M1 maintains the off state.

The burst control circuit 50 is provided in order to detect the light load state of the DC/DC converter 200, so as to control the burst operation.

FIG. 3 is a diagram for explaining the operation of the burst mode. The DC/DC converter 200 enters the light load state at the time point t0. After the DC/DC converter 200 enters the light load state, the output voltage $V_{OUT}$ rises due to the excessive duty ratio, which lowers the feedback voltage $V_{FB}$. The burst control circuit 50 includes a comparator that compares the feedback voltage $V_{FB}$ with a predetermined burst threshold value $V_{BURST}$.

When the feedback voltage $V_{FB}$ becomes lower than the burst threshold value $V_{BURST}$, the burst control circuit 50 negates (e.g., set to the low level) the burst control signal $S_{BURST}$. The pulse modulator 10 fixedly sets the pulse signal $S_{PWM}$ to the off level during a period in which the burst control signal $S_{BURST}$ is negated, thereby suspending the switching operation of the switching transistor M1.

After the switching operation of the switching transistor M1 is suspended, which suspends the charging operation for the output capacitor C1, the output voltage $V_{OUT}$ gradually drops due to discharging in the form of current that flows through the load. As the output voltage $V_{OUT}$ becomes lower, the feedback voltage $V_{FB}$ rises with time. The feedback voltage $V_{FB}$ changes with a delay according to the change in the output voltage $V_{OUT}$. The delay is determined by the time constant of the feedback loop.

When the feedback voltage $V_{FB}$ exceeds the threshold voltage $V_{BURST}$ at the time point t2, the burst control circuit 50 asserts (sets to the high level, for example) the burst control signal $S_{BURST}$. After the burst control signal $S_{BURST}$ is asserted, the switching operation of the switching transistor M1 is restarted. As the output voltage $V_{OUT}$ rises according to the switching operation of the switching transistor M1, the feedback voltage $V_{FB}$ falls. When the feedback voltage $V_{FB}$ becomes lower than the threshold voltage $V_{BURST}$ at the time point t3, the switching operation of the switching transistor M1 is suspended.

As a result of investigating such a flyback converter 200r, the present inventor has come to recognize the following problem.

With the flyback converter 200r, the burst frequency (or otherwise the burst period, which is the reciprocal of the burst frequency) of the burst operation is determined by the capacitance of the output capacitor C1, the inductance of the inductor L1, and the like. Furthermore, the burst frequency varies due to the electrical state of the flyback converter 200r such as the amount of a current that flows through the load, the input voltage $V_{IN}$, or the like.

In a case in which the burst frequency becomes excessively high, i.e., the frequency of the burst switching becomes excessively high, this leads to increased switching loss that occurs in the flyback converter 200r in the light load state. This leads to degraded efficiency. Furthermore, in a case in which the burst frequency becomes excessively high, in some cases, it falls in the audible band. In some cases, this leads to the occurrence of a ringing sound in the transformer T1.

SUMMARY OF THE INVENTION

The present invention has been made in order to solve such a problem. Accordingly, it is an exemplary purpose of an embodiment of the present invention to provide a DC/DC converter that is capable of adjusting the operation condition for controlling the burst mode.

An embodiment of the present invention relates to an insulated DC/DC converter. The insulated DC/DC converter comprises: a transformer comprising a primary winding and a secondary winding; a switching transistor and a sense resistor coupled in series between the primary winding of the transformer and a ground line; a rectifier element coupled to the secondary winding of the transformer; a photocoupler having a light-emitting element and a light-receiving element; a feedback circuit structured to drive the light-emitting element of the photocoupler such that an output voltage of the DC/DC converter approaches a target voltage; a primary-side controller comprising a feedback terminal coupled to the light-receiving element of the photocoupler and structured to receive a feedback signal from the photocoupler, a current detection terminal structured to receive a current detection signal that corresponds to a voltage drop across the sense resistor, and a current mode modulator structured to generate a pulse signal according to a voltage at the feedback terminal and a voltage at the current detection terminal, and structured to suspend a switching operation when the voltage at the feedback terminal is lower than a threshold value; and a burst mode adjustment circuit structured to shift the voltage at the current detection terminal according to an electrical state of the DC/DC converter.

When a given input voltage is supplied, the duty ratio required to maintain a given output voltage and a given output current (load current) is uniquely determined. In a case in which the voltage at the current detection terminal is shifted, the voltage at the feedback terminal changes according to a change in the voltage at the current detection terminal while maintaining the required duty ratio. Such an arrangement is capable of changing the relative relation between the voltage at the feedback terminal and the threshold voltage. Thus, such an arrangement is capable of changing the condition used to transit to the burst mode.

Also, the burst mode adjustment circuit may be structured to shift the voltage at the current detection terminal according to a load state of the DC/DC converter. Such an arrangement allows the condition used to transit to the burst mode to be changed according to the load state.

For example, when the load state becomes lighter than a predetermined load state (when the output power becomes smaller than a predetermined power), the burst mode adjustment circuit may shift the voltage at the current detection terminal to the upper side. As a result of the voltage shifting operation, the voltage at the feedback terminal is shifted such that it is maintained at a level that is higher than the threshold voltage. Such an arrangement is capable of impeding the transition to the burst mode, or otherwise of returning the mode from the burst mode.

Also, the transformer may further comprise an auxiliary winding. Also, the burst mode adjustment circuit may comprise: a diode having an anode coupled to the auxiliary winding; and a capacitor coupled to a cathode of the diode. Also, the burst mode adjustment circuit may be structured to shift the voltage at the current detection terminal based on a voltage across the capacitor. As the load state becomes lighter, the voltage across the capacitor becomes higher. Thus, by using the voltage across the capacitor, such an arrangement is capable of changing the condition for transition to the burst mode according to the load state.

Also, the burst mode adjustment circuit may further comprise: a first resistor arranged between the cathode of the diode and the current detection terminal; and a second resistor arranged between the current detection terminal and a connection node that couples the sense resistor and the switching transistor. Also, the burst mode adjustment circuit may further comprise a first Zener diode coupled to the first resistor in series between the cathode of the diode and the current detection terminal.

Also, the burst mode adjustment circuit may further comprise a second Zener diode coupled in parallel with the capacitor. Such an arrangement is capable of clamping the voltage across the capacitor.

Also, the burst mode adjustment circuit may be structured to shift the voltage at the current detection terminal according to an input voltage of the DC/DC converter. Thus, such an arrangement is capable of changing the condition for transition to the burst mode according to the input voltage.

Also, the burst mode adjustment circuit may comprise: a third resistor arranged between an input terminal of the DC/DC converter and the current detection terminal; a fourth resistor arranged between the current detection terminal and the ground line; and a fifth resistor arranged between the current detection terminal and a connection node that couples the sense resistor and the switching transistor.

Another embodiment of the present invention also relates to an insulated DC/DC converter. The insulated DC/DC converter comprises: a transformer comprising a primary winding and a secondary winding; a switching transistor and a sense resistor coupled in series between the primary winding of the transformer and a ground line; a rectifier element coupled to the secondary winding of the transformer; a photocoupler having a light-emitting element and a light-receiving element; a feedback circuit structured to drive the light-emitting element of the photocoupler such that an output voltage of the DC/DC converter approaches a target voltage; a primary-side controller comprising a feedback terminal coupled to the light-receiving element of the photocoupler so as to allow a feedback signal to be received from the photocoupler, and a current detection terminal structured to receive a current detection signal that corresponds to a voltage drop across the sense resistor, and structured to be switchable between a normal mode and a burst mode; and a burst mode adjustment circuit structured that, when an electrical state of the DC/DC converter satisfies a predetermined condition, a transition to the burst mode is inhibited, or otherwise a transition is forced from the burst mode to the normal mode.

With such an embodiment, the condition for transition to the burst mode can be changed according to the electrical state of the DC/DC converter.

Also, the burst mode adjustment circuit may be structured to shift the voltage at the current detection terminal according to the electrical state of the DC/DC converter.

Also, the primary-side controller may comprise a comparator structured to compare the voltage at the feedback terminal with a threshold voltage. Also, based on the comparison result, the operation mode may be switchable between the normal mode and the burst mode. Also, the burst mode adjustment circuit may be structured to change the threshold voltage according to the electrical state of the DC/DC converter.

Also, the electrical state of the DC/DC converter may include a load state of the DC/DC converter. Also, the electrical state of the DC/DC converter may include an input voltage of the DC/DC converter.

Yet another embodiment of the present invention relates to an electronic device. The electronic device comprises: a load; a diode rectifier circuit structured to perform full-wave rectification of a commercial AC voltage; a smoothing capacitor structured to smooth an output voltage of the diode rectifier circuit, so as to generate a DC input voltage; and the DC/DC converter structured to step down the DC input voltage, and to supply the voltage thus stepped down to the load.

Yet another embodiment of the present invention relates to an AC adapter. The AC adapter comprises: a diode rectifier circuit structured to perform full-wave rectification of a commercial AC voltage; a smoothing capacitor structured to smooth an output voltage of the diode rectifier circuit, so as to generate a DC input voltage; and the DC/DC converter structured to step down the DC input voltage, and to supply the voltage thus stepped down to the load.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, examples of the state represented by the phrase "the member A is coupled to the member B" include: a state in which the member A is physically and directly coupled to the member B; and a state in which the member A is coupled to the member B via another member that does not substantially affect the electric connection therebetween, or that does not damage the functions of the connection therebetween.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions of the connection therebetween, in addition to a state in which they are directly coupled.

Figure 1:
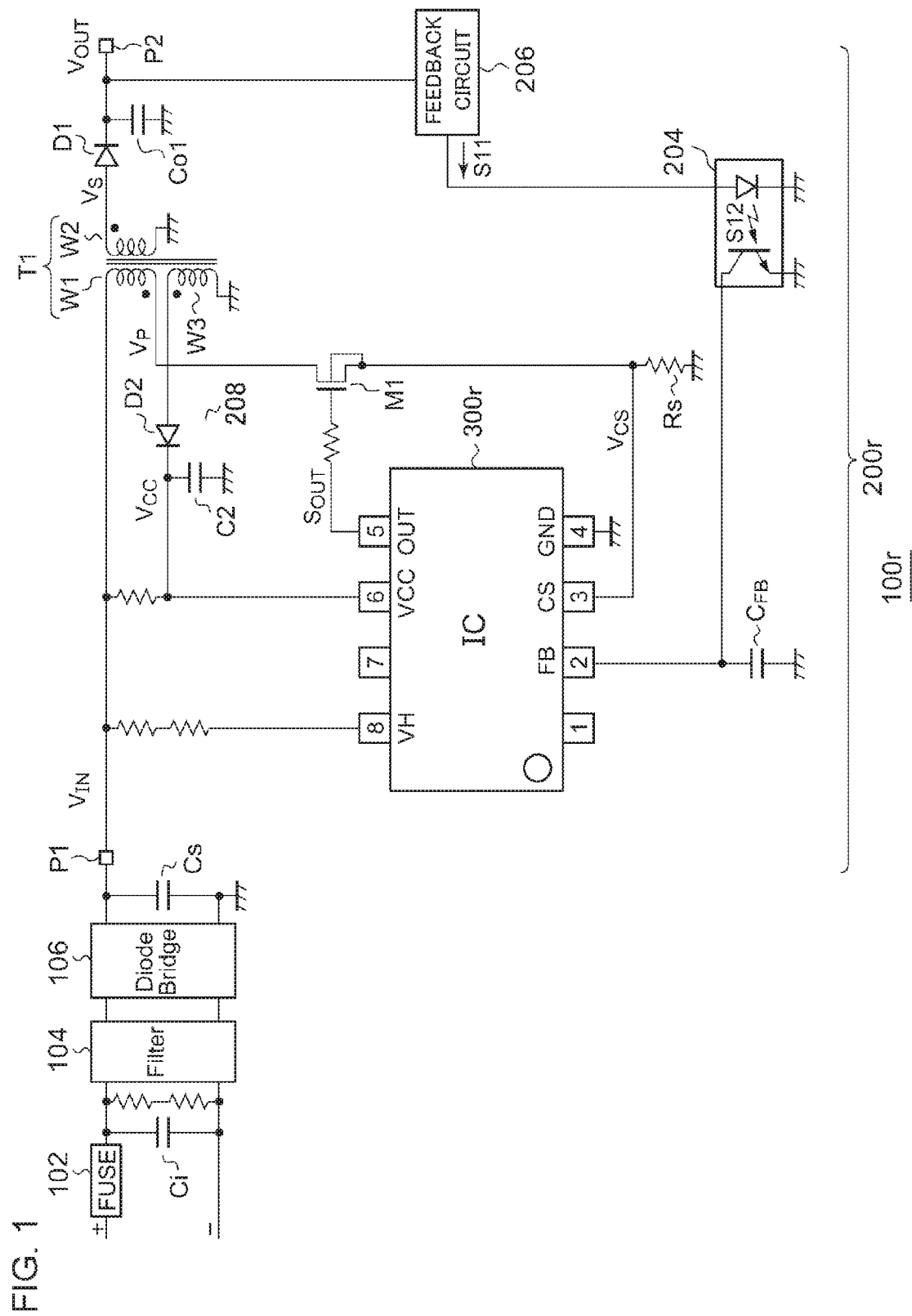
FIG. 1 is a circuit diagram showing an AC/DC converter including a diode rectifier flyback converter.
Figure 4:
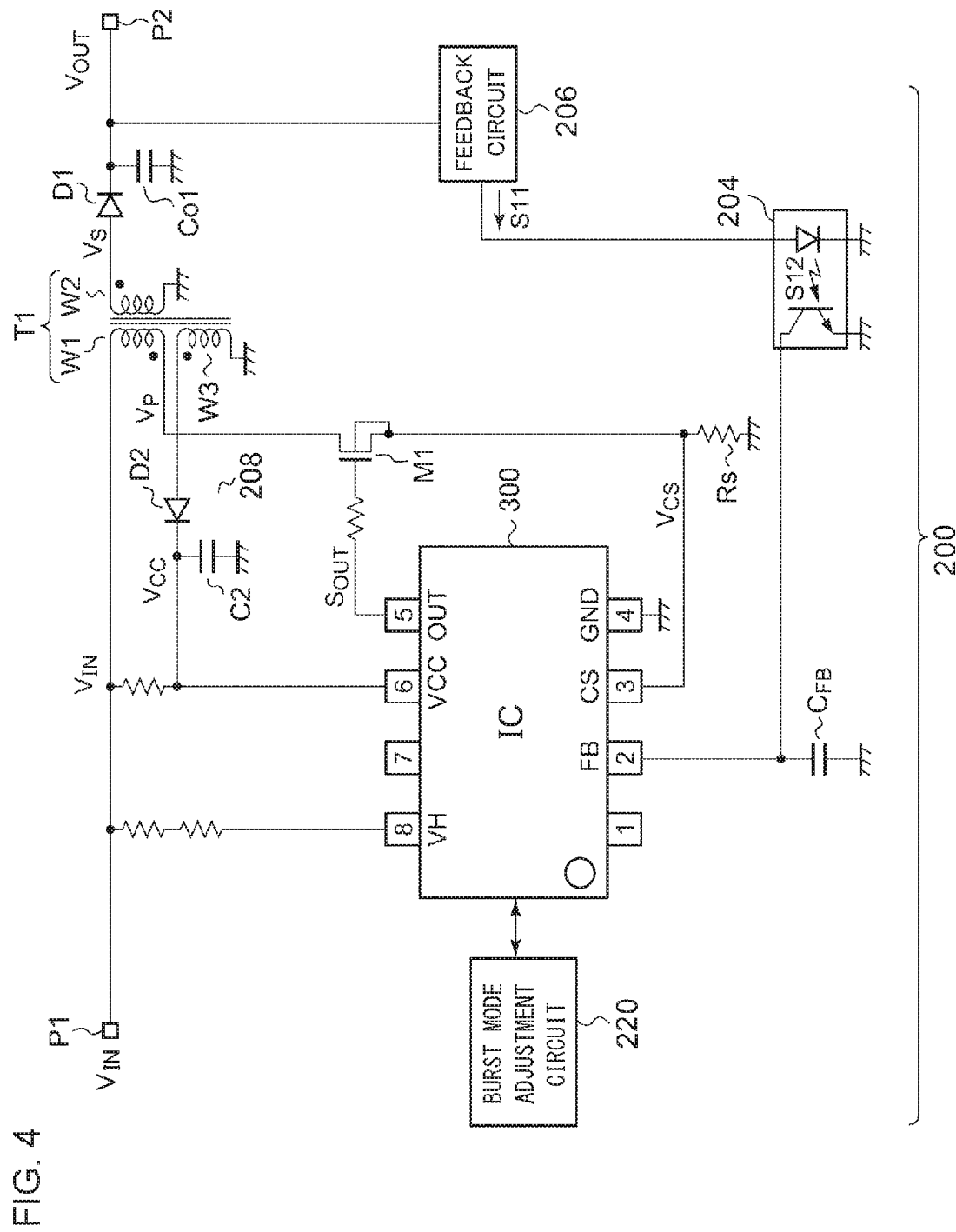
FIG. 4 is a circuit block diagram showing a DC/DC converter according to an embodiment.

FIG. 4 is a circuit block diagram showing a DC/DC converter 200 according to an embodiment. The DC/DC converter 200 further includes a burst mode adjustment circuit 220 in addition to the flyback converter 200r configuration shown in FIG. 1.

Figure 2:
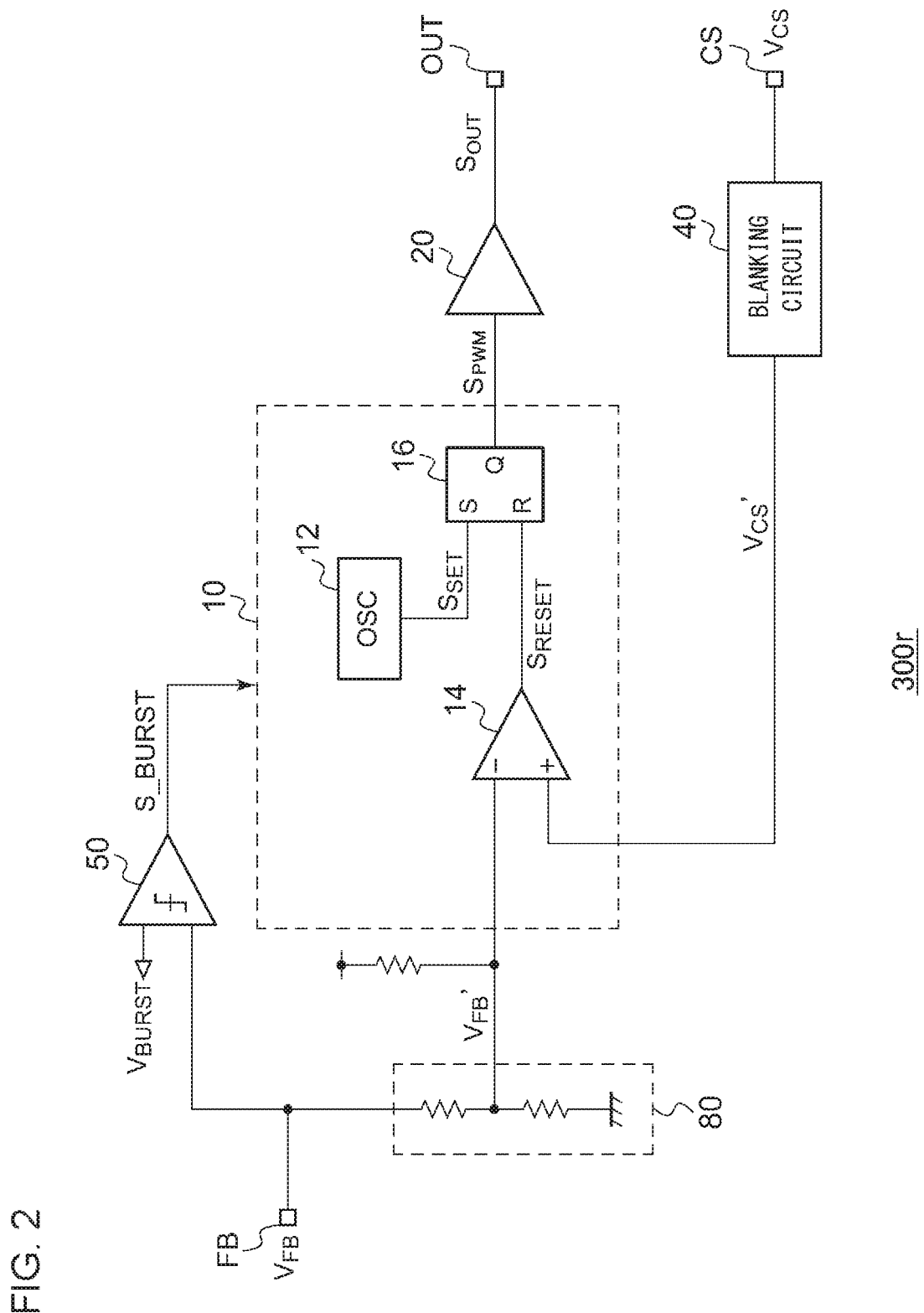
FIG. 2 is a circuit diagram showing a configuration of a control circuit investigated by the present inventors.
Figure 3:
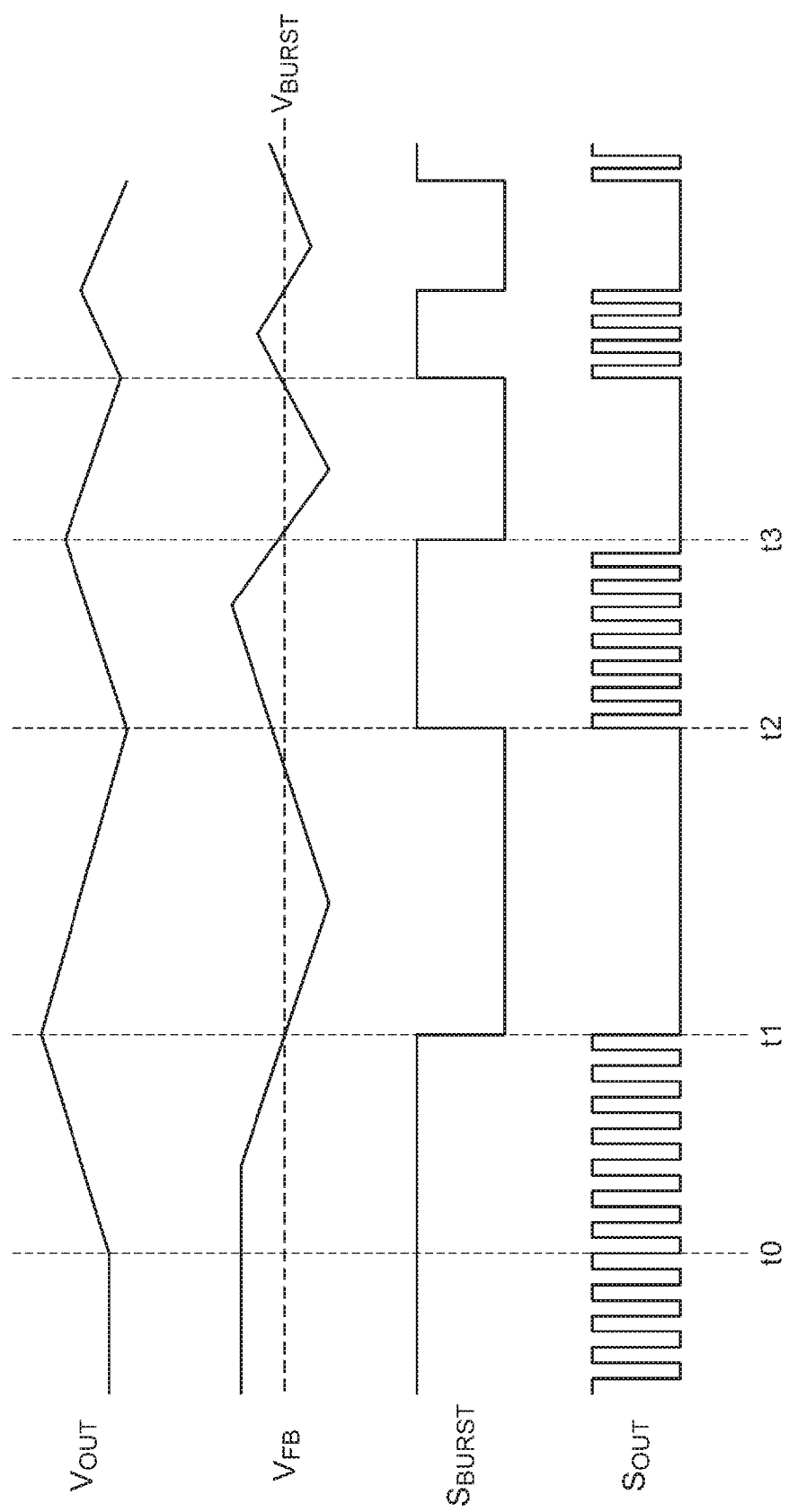
FIG. 3 is a diagram for explaining the operation in the burst mode.

As described above with reference to FIGS. 1 and 2, the primary-side controller 300 is configured to operate in the burst mode when it is in the light load state. Specifically, the primary-side controller 300 suspends the switching operation of the switching transistor M1 during a period in which the voltage $V_{FB}$ at the FB terminal is lower than a predetermined threshold voltage.

When the electrical state of the DC/DC converter 200 matches a predetermined condition, the burst mode adjustment circuit 220 inhibits transition to the burst mode, or otherwise forces transition from the burst mode to a normal mode.

It should be noted that the burst mode adjustment circuit 220 may be arranged as an external component of the primary-side controller 300. Also, the burst mode adjustment circuit 220 may be configured as a built-in component of the primary-side controller 300.

With the present embodiment, the electrical state of the DC/DC converter 200 includes the load state (output power) of the DC/DC converter 200. In a case in which the DC/DC converter 200 provides an output voltage $V_{OUT}$ having a constant voltage value, the output power signifies, namely, the output current $I_{OUT}$. As a predetermined condition, such an arrangement may employ a condition that the output power is lower than a predetermined value (the output current $I_{OUT}$ is smaller than a predetermined value).

The above is the basic configuration of the DC/DC converter 200. Next, description will be made regarding the operation thereof.

When the output power is higher than the predetermined value, i.e., when the predetermined condition is not fulfilled, the burst mode adjustment circuit 220 allows transition of the primary-side controller 300 to the burst mode. Conversely, when the output power becomes lower than the threshold value, the burst mode adjustment circuit 220 inhibits transition of the primary-side controller 300 to the burst mode, or otherwise forcibly returns the primary-side controller 300 to the normal mode.

Figure 5A:
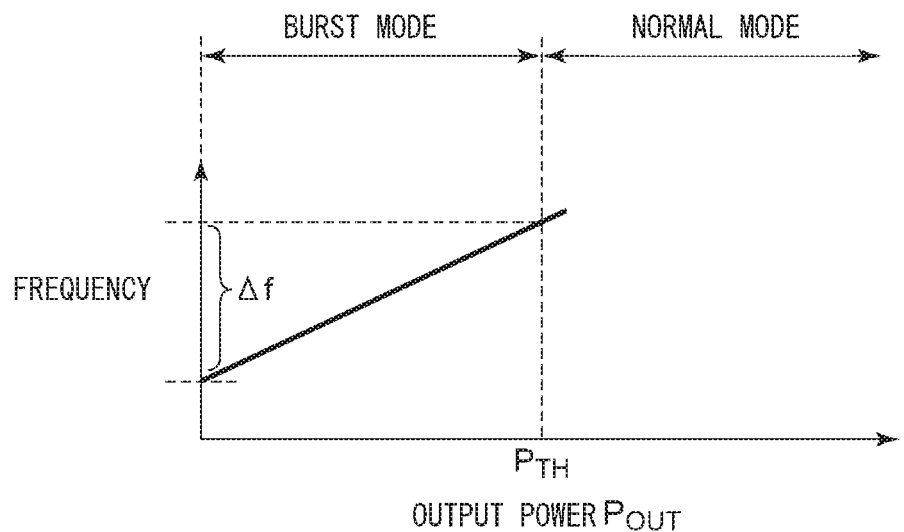
FIGS. 5A and 5B are diagrams each showing the operation of the DC/DC converter shown in FIG. 4.
Figure 5B:
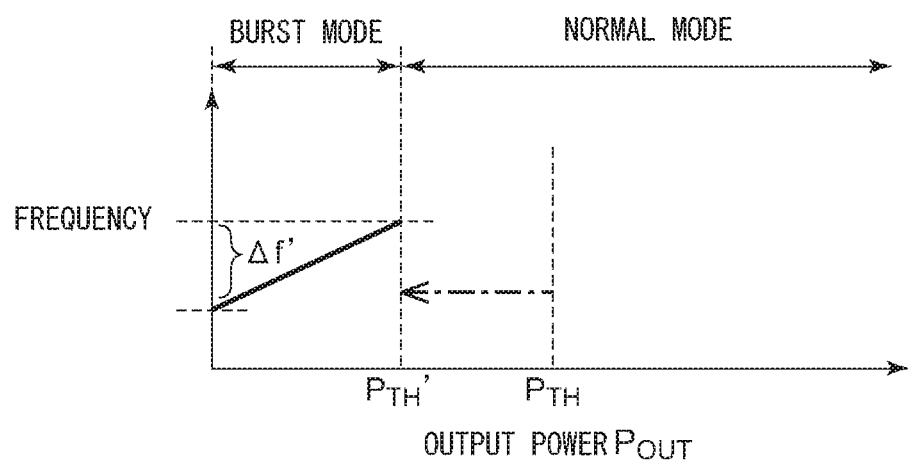

FIGS. 5A and 5B are diagrams for explaining the operation of the DC/DC converter 200 shown in FIG. 4. FIG. 5A shows the operation of a DC/DC converter including no burst mode adjustment circuit 220, i.e., shows the operation of a conventional DC/DC converter. FIG. 5B shows the operation of the DC/DC converter 200 including the burst mode adjustment circuit 220.

Description will be made with reference to FIG. 5A regarding the operation of the conventional DC/DC converter. A threshold value $P_{TH}$ of transition between the burst mode and the normal mode is determined by the burst threshold value $V_{BURST}$ shown in FIG. 2. The intermittent oscillation frequency involved in the burst mode dynamically changes according to the change in the output power. In some cases, the intermittent oscillation frequency range Δf belongs to a band that is not suitable for the system, depending on a combination of the input voltage $V_{IN}$, the output voltage $V_{OUT}$, circuit constants employed in the DC/DC converter 200, or the like, which is a problem.

With conventional techniques, in order to adjust the frequency range Δf, there is a need to greatly change the circuit constants, which requires enormous effort.

Description will be made with reference to FIG. 5B regarding the operation of the DC/DC converter 200 shown in FIG. 4. When the output power $P_{OUT}$ is larger than a predetermined value $P_{BURST}$, i.e., when the predetermined condition is not fulfilled, the burst mode adjustment circuit 220 allows transition of the primary-side controller 300 to the burst mode. Conversely, when the output power $P_{OUT}$ becomes lower than the threshold value $P_{BURST}$, the burst mode adjustment circuit 220 inhibits transition of the primary-side controller 300 to the burst mode, or otherwise forcibly returns the primary-side controller 300 to the normal mode. That is to say, the threshold value $P_{TH}'$ of transition between the burst mode and the normal mode is shifted toward the light load side as compared with the threshold value $P_{TH}$ determined by the threshold voltage $V_{BURST}$ which is an internal voltage generated in the primary-side controller 300. This allows the intermittent oscillation frequency range to be narrowed.

As described above, with the DC/DC converter 200 according to the embodiment, such an arrangement is capable of adjusting the operation condition for the burst mode.

The present invention encompasses various kinds of apparatuses and circuits that can be regarded as a block configuration or a circuit configuration shown in FIG. 4, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

First Embodiment

Figure 6:
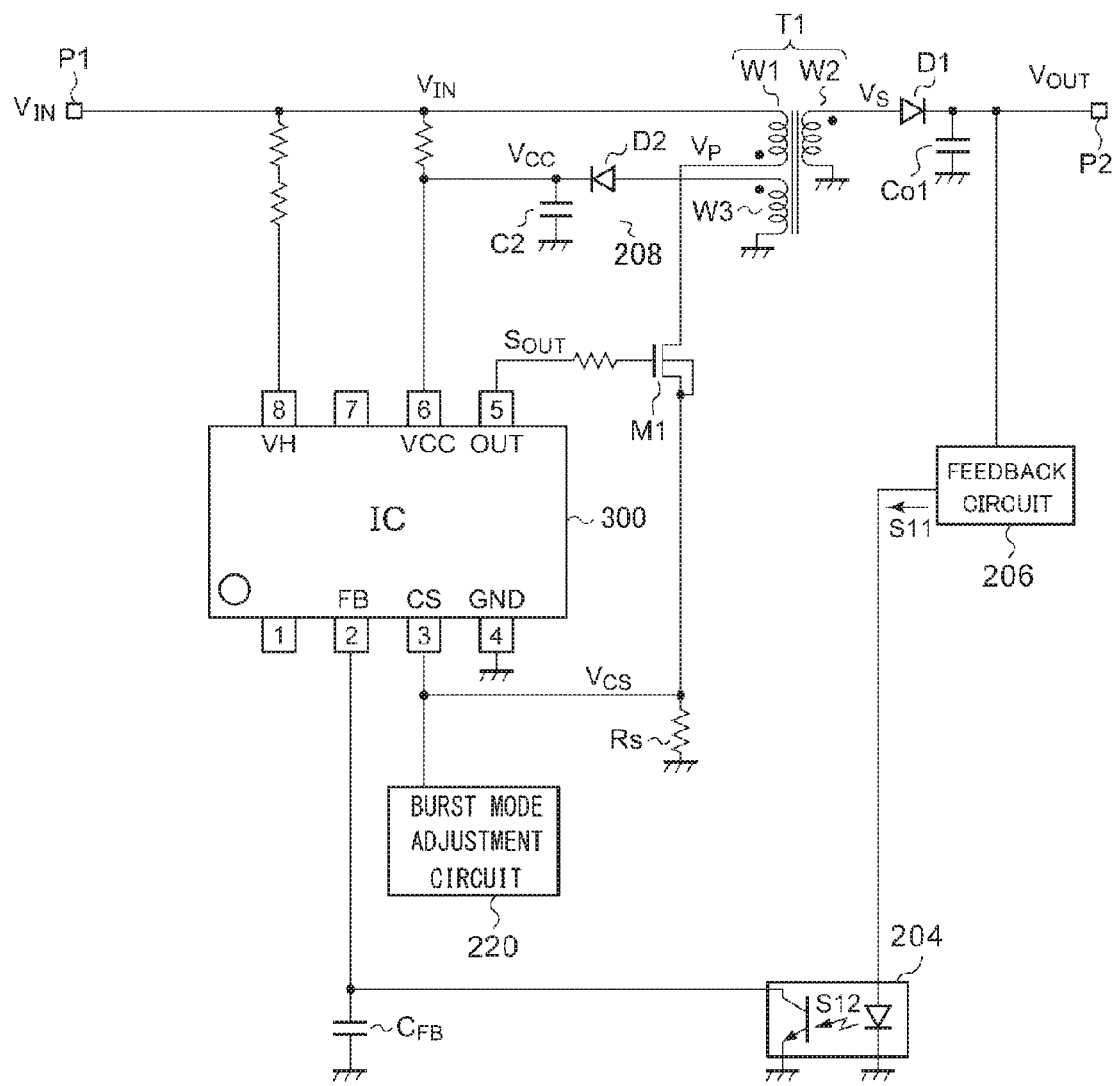
FIG. 6 is a circuit diagram showing a DC/DC converter according to a first embodiment.

FIG. 6 is a circuit diagram showing a DC/DC converter 200a according to a first embodiment. In the DC/DC converter 200a, a burst mode adjustment circuit 220a is configured as an external component of the primary-side controller 300. The primary-side controller 300 may have the same configuration as that shown in FIG. 2.

The burst mode adjustment circuit 220a is configured to shift the voltage at the CS terminal according to the electrical state of the DC/DC converter 200. With the first embodiment, as the electrical state of the DC/DC converter 200a, the output power of the DC/DC converter 200a is employed as described above.

That is to say, the burst mode adjustment circuit 220a monitors the output power $P_{OUT}$ of the DC/DC converter 200a, so as to shift the voltage at the CS terminal according to the output power $P_{OUT}$ thus monitored. The monitoring method for the output power $P_{OUT}$ is not restricted in particular. For example, when the output power $P_{OUT}$ is larger than a predetermined threshold value $P_{BURST}$, the burst mode adjustment circuit 220a provides no effect on the CS terminal. On the other hand, when the output power $P_{OUT}$ becomes smaller than the threshold value $P_{BURST}$, the burst mode adjustment circuit 220a shifts the voltage at the CS terminal toward the higher electric potential side.

Figure 7A:
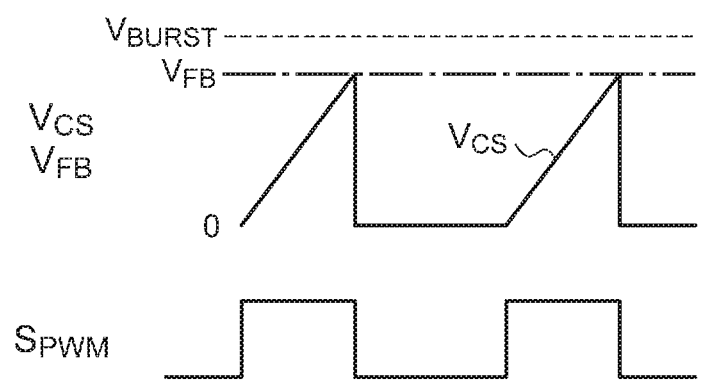
FIG. 7A is an operation waveform diagram showing the operation of a conventional DC/DC converter.
Figure 7B:
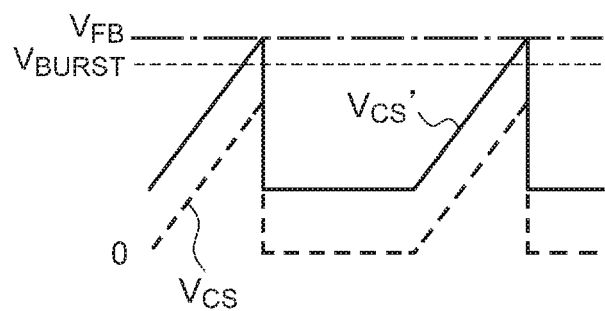
FIG. 7B is an operation waveform diagram showing the operation of the DC/DC converter shown in FIG. 6.

FIG. 7A is an operation waveform diagram showing the operation of a conventional flyback converter 200r. FIG. 7B is an operation waveform diagram showing the operation of the DC/DC converter 200a shown in FIG. 6. Both the drawings show the operation when $P_{OUT} < P_{BURST}$. In the operation shown in FIG. 7A, the condition $V_{FB} < V_{BURST}$ holds true. Accordingly, the flyback converter 200r operates in the burst mode.

Description will be made with reference to FIG. 7B. The burst mode adjustment circuit 220a shifts the voltage $V_{CS}'$ at the CS terminal by $\Delta V$ toward the higher electric potential side. Description will be made assuming that the operations shown in FIGS. 7A and 7B each provide the same output power $P_{OUT}$. In this case, the feedback voltage $V_{FB}$ shown in FIG. 7B is shifted to the higher electric potential side according to the current detection signal $V_{CS}'$ while maintaining the duty ratio of the PWM signal $S_{PWM}$. As a result, the feedback voltage $V_{FB}$ does not become lower than the burst threshold voltage $V_{BURST}$. Thus, such an arrangement inhibits transition to the burst mode, or otherwise forces transition from the burst mode to the normal mode.

Figure 8:
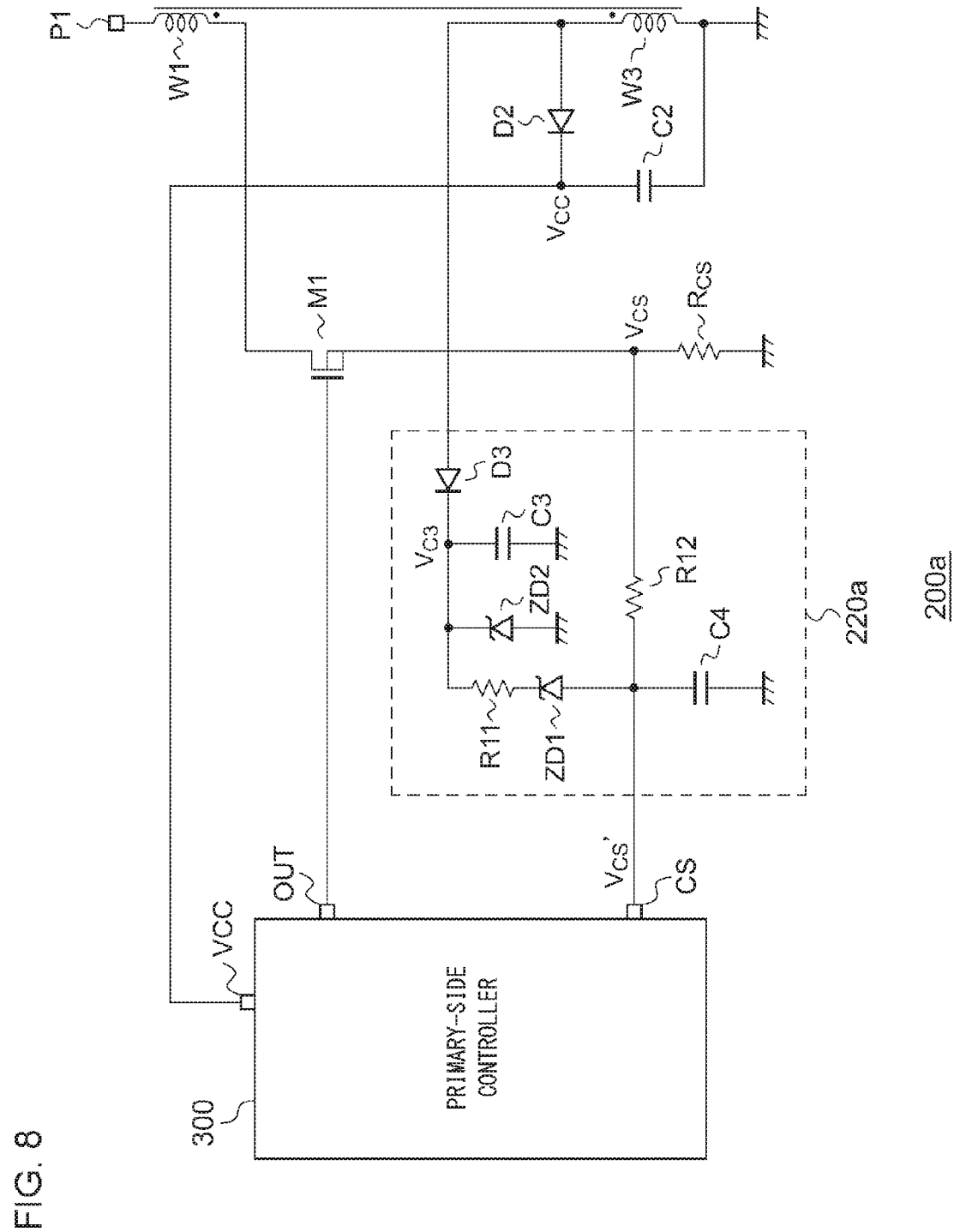
FIG. 8 is a circuit diagram showing a specific example configuration of a burst mode adjustment circuit shown in FIG. 6.

FIG. 8 is a circuit diagram showing a specific example configuration of the burst mode adjustment circuit 220a shown in FIG. 6. The anode of a diode D3 included in the burst mode adjustment circuit 220a is coupled to the auxiliary winding W3. A capacitor C3 is coupled to the cathode of the diode D3. In the heavy load state of the DC/DC converter 200a, a voltage $V_{C3}$ occurs across the capacitor C3 according to the output voltage $V_{OUT}$ and the winding ratio between the secondary winding W2 and the auxiliary winding W3. As the load state becomes heavier, the voltage $V_{C3}$ across the capacitor C3 becomes higher. That is to say, the voltage $V_{C3}$ across the capacitor C3 has a correlation with the output power $P_{OUT}$ of the DC/DC converter 200a.

When the voltage $V_{C3}$ across the capacitor C3 exceeds a predetermined threshold value, the burst mode adjustment circuit 220a shifts the voltage $V_{CS}'$ at the CS terminal toward the higher electric potential side.

A first resistor R11 and a first Zener diode ZD1 are arranged in series between the capacitor C3 and the CS terminal. A second resistor R12 is arranged between the CS terminal and the source of the switching transistor M1. The capacitor C3 is coupled to the CS terminal. The second Zener diode ZD2 is arranged in parallel with the capacitor C3, which clamps the voltage across the capacitor C3 below a predetermined value (Zener voltage).

When the DC/DC converter 200a enters a heavy load state, the voltage $V_{C3}$ across the capacitor C3 rises, which turns on the first Zener diode ZD1. In this state, the voltage $V_{CS}'$ at the CS terminal is pulled up to the higher electric potential side by the first resistor R11.

With the burst mode adjustment circuit 220a shown in FIG. 8, such an arrangement is capable of monitoring the output power $P_{OUT}$ of the DC/DC converter 200 based on the voltage across the capacitor C3. Furthermore, when the output power $P_{OUT}$ becomes smaller than the threshold value, such an arrangement is capable of shifting the voltage $V_{CS}'$ at the CS terminal toward the higher electric potential side.

The DC/DC converter 200a shown in FIG. 8 can be configured by further providing the conventional flyback converter 200r configuration with only a small number of peripheral circuit components as additional components, so as to allow the operation condition for the burst mode to be freely set.

The burst mode adjustment circuit 220a shown in FIG. 8 may be configured including a comparator that compares the voltage $V_{C3}$ across the capacitor C3 with a predetermined threshold voltage, and a current source or otherwise a resistor, configured to inject a source current to the CS terminal according to the output of the comparator.

Second Embodiment

Figure 9:
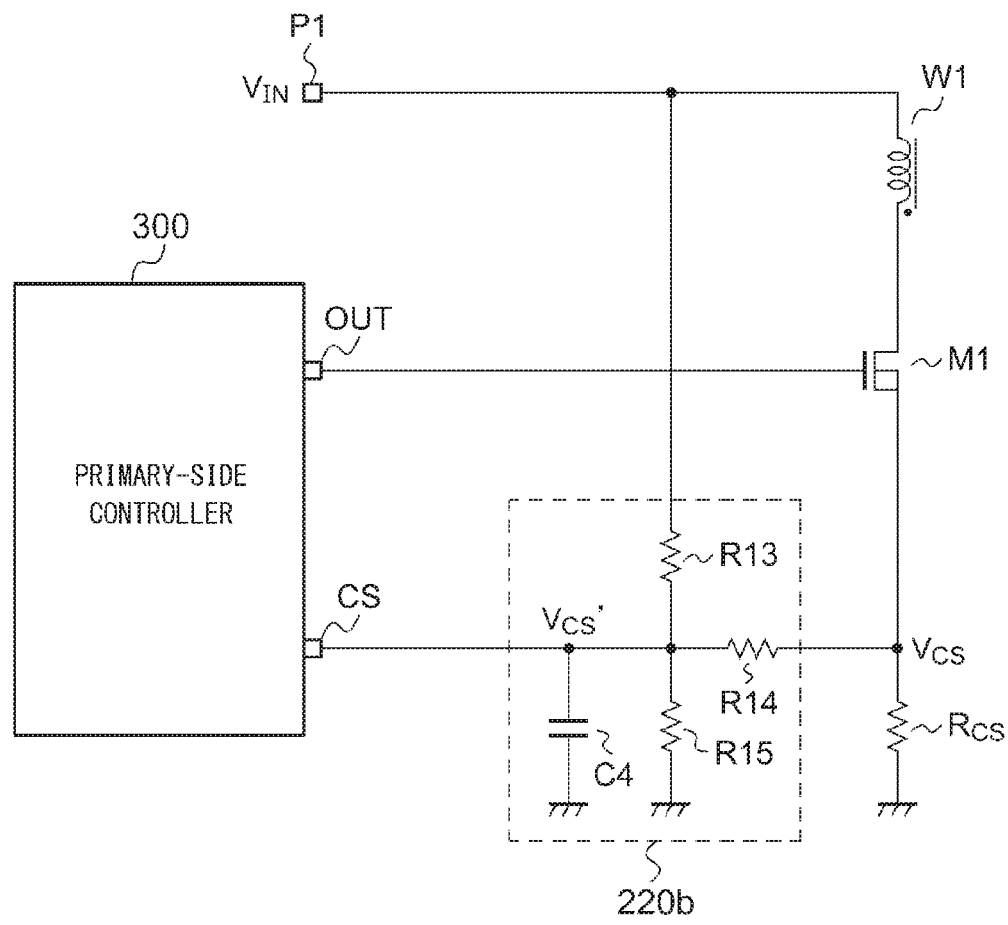
FIG. 9 is a circuit diagram showing a part of a DC/DC converter according to a second embodiment.

FIG. 9 is a circuit diagram showing a part of a DC/DC converter 200b according to a second embodiment. With the second embodiment, the input voltage $V_{IN}$ is employed as the electrical state of the DC/DC converter 200b to be monitored by the burst mode adjustment circuit 220b. With such an arrangement, the burst mode adjustment circuit 220b shifts the voltage at the CS terminal according to the input voltage $V_{IN}$.

The burst mode adjustment circuit 220b includes a third resistor R13 arranged between the input terminal P1 (input line) and the CS terminal, a fourth resistor R14 arranged between the CS terminal and the ground, and a fifth resistor R15 arranged between the CS terminal and the source of the switching transistor M1. A capacitor C4 may be coupled to the CS terminal.

With the DC/DC converter 200b, as the input voltage $V_{IN}$ becomes higher, the voltage $V_{CS}'$ at the CS terminal becomes higher, i.e., it shifts toward the higher electric potential side. Accordingly, the feedback voltage $V_{FB}$ shifts toward the high electric potential side according to the shift of the voltage $V_{CS}'$ toward the high electric potential side in the same manner as described with reference to FIG. 7B. In this state, the feedback voltage $V_{FB}$ does not become lower than the burst threshold voltage $V_{BURST}$. Such an arrangement is capable of inhibiting transition to the burst mode, or otherwise of forcing transition from the burst mode to the normal mode.

In the second embodiment, when the input voltage $V_{IN}$ exceeds a predetermined threshold value, the burst mode adjustment circuit 220b may shift the voltage $V_{CS}'$ at the CS terminal toward the higher electric potential side.

Third Embodiment

Figure 10:
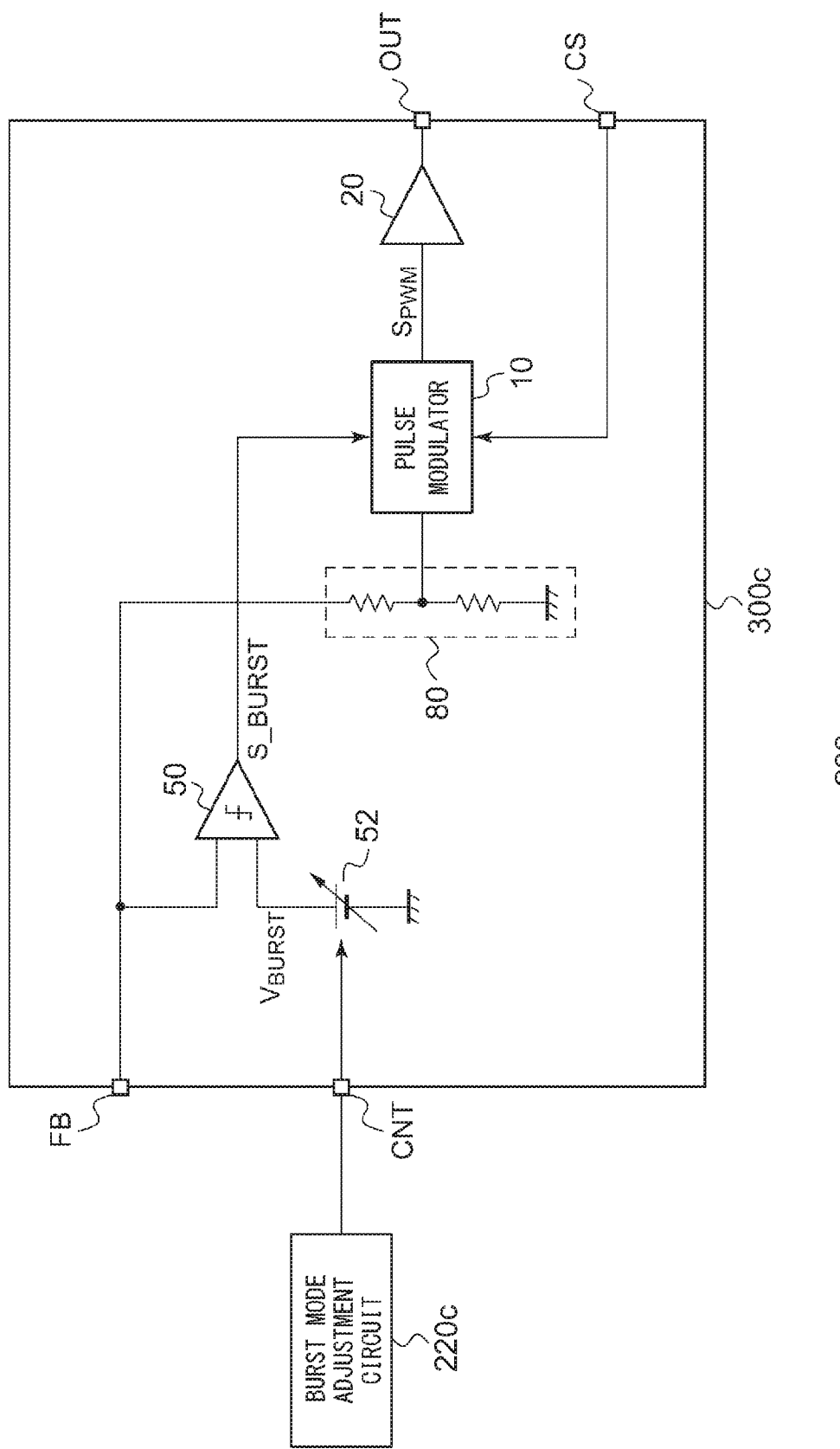
FIG. 10 is a circuit diagram showing a part of a DC/DC converter according to a third embodiment.

FIG. 10 is a circuit diagram showing a part of a DC/DC converter 200c according to a third embodiment. The burst mode adjustment circuit 220c changes the burst threshold value voltage $V_{BURST}$ based on the electrical state of the DC/DC converter 200c. For example, a voltage source 52 that generates the burst threshold voltage $V_{BURST}$ may be configured as a variable voltage source. The burst mode adjustment circuit 220c includes a control (CNT) terminal at which a control signal is to be received from the burst mode adjustment circuit 220c.

For example, when the output power $P_{OUT}$ of the DC/DC converter 200c is larger than a threshold value, the threshold voltage $V_{BURST}$ is set to a first value. Conversely, when the output power $P_{OUT}$ becomes smaller than the threshold value, the threshold voltage $V_{BURST}$ is set to a second value that is larger than the first value. Alternatively, the burst mode adjustment circuit 220c may raise the threshold voltage $V_{BURST}$ according to a decrease in the output power $P_{OUT}$.

Also, the burst mode adjustment circuit 220c may change the threshold voltage $V_{BURST}$ based on the input voltage $V_{IN}$.

For example, the burst mode adjustment circuit 220c may raise the threshold voltage $V_{BURST}$ according to an increase in the input voltage $V_{IN}$. Also, when the input voltage $V_{IN}$ exceeds a given threshold, the burst mode adjustment circuit 220c may shift the burst threshold voltage $V_{BURST}$.

The burst mode adjustment circuit 220c may have the same configuration as that shown in FIG. 8 or 9. Also, the burst mode adjustment circuit 220c may have other different configurations.

Fourth Embodiment

Figure 11:
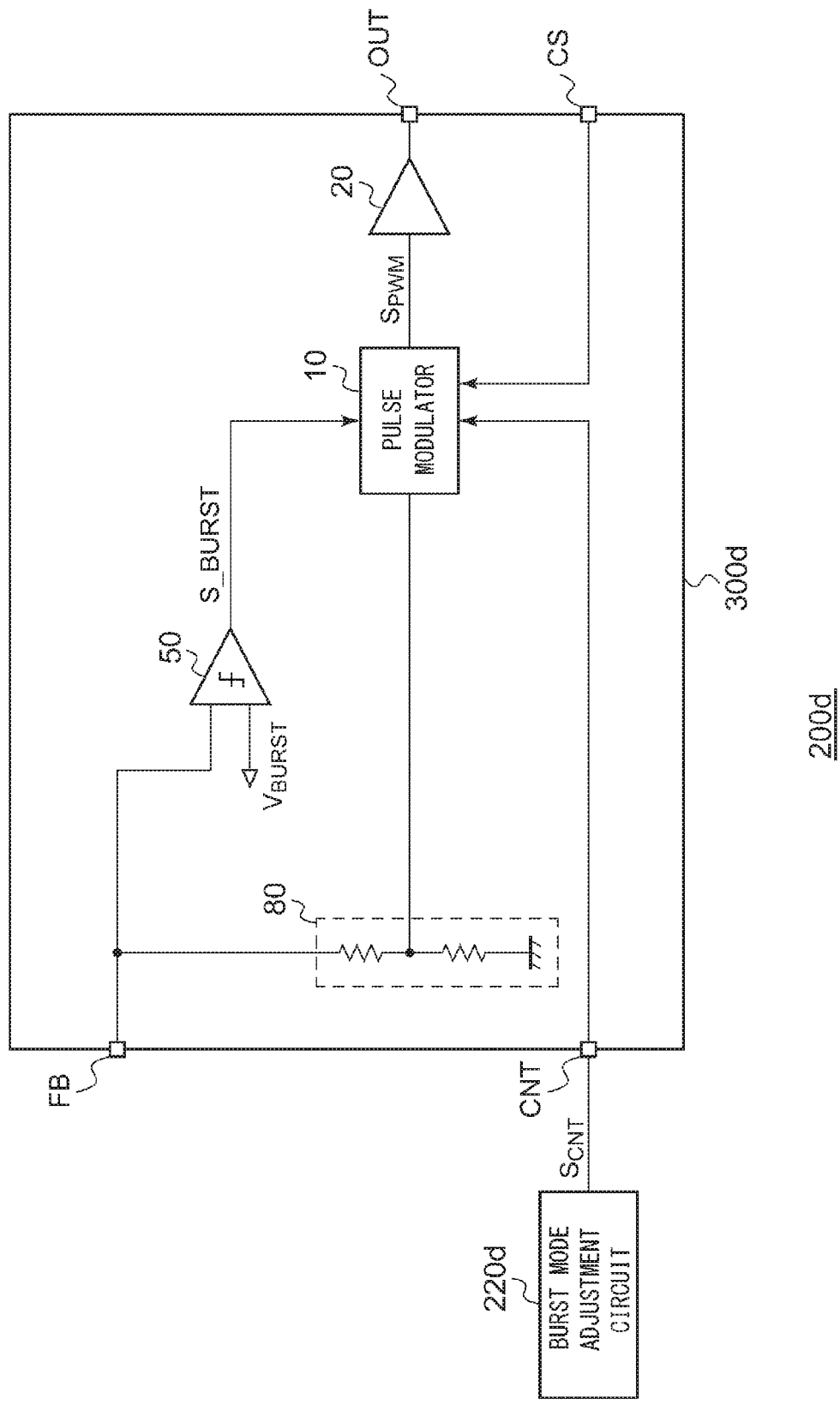
FIG. 11 is a circuit diagram showing a part of a DC/DC converter according to a fourth embodiment.

FIG. 11 is a circuit diagram showing a part of a DC/DC converter 200d according to a fourth embodiment. Upon detecting an electrical state of the DC/DC converter 200 in which the burst mode is to be inhibited, the burst mode adjustment circuit 220d asserts a control signal $S_{CNT}$. When the control signal $S_{CNT}$ is asserted, the pulse modulator 10 operates in the normal mode regardless of the output S_BURST of the burst control circuit 50.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

The burst mode adjustment circuit 220 may control the burst operation based on both the input voltage $V_{IN}$ and the output power $P_{OUT}$ of the DC/DC converter 200. Also, the burst mode adjustment circuit 220 may control the burst operation based on other electrical states instead of the input voltage $V_{IN}$ or the output power $P_{OUT}$.

[Second Modification]

Description has been made in the first embodiment regarding an arrangement in which the load state is monitored based on the voltage $V_{C3}$ across the capacitor C3. However, the present invention is not restricted to such an arrangement. Also, an additional photocoupler may be provided in order to monitor the load state, in addition to the photocoupler 204. With such an arrangement, the load state may be monitored based on the state of such an additional photocoupler.

[Third Modification]

The DC/DC converter 200 may be configured as a quasi-resonant converter. When the energy stored in the transformer T1 becomes substantially zero, the primary-side controller 300 may assert the set signal $S_{SET}$, so as to turn on the switching transistor M1. The quasi-resonant primary-side controller 300 includes a ZT terminal. After the voltage at one end of the auxiliary winding W3 is divided, the voltage thus divided is input to the ZT terminal. It should be noted that the quasi-resonant pulse modulator 10 may be configured using known techniques.

[Fourth Modification]

Description has been made in the embodiments regarding an arrangement in which the DC/DC converter 200 is configured as a diode rectification flyback converter. However, the configuration of the DC/DC converter 200 is not restricted to such an arrangement. The present invention is also applicable to synchronous rectification flyback converters and other kinds of insulated converters.

[Usage]

Lastly, description will be made regarding the usage of the DC/DC converter 200. The DC/DC converter 200 may be employed in an AC/DC converter 100 preferably employed in AC adapters or power supply blocks included in electronic devices.

Figure 12:
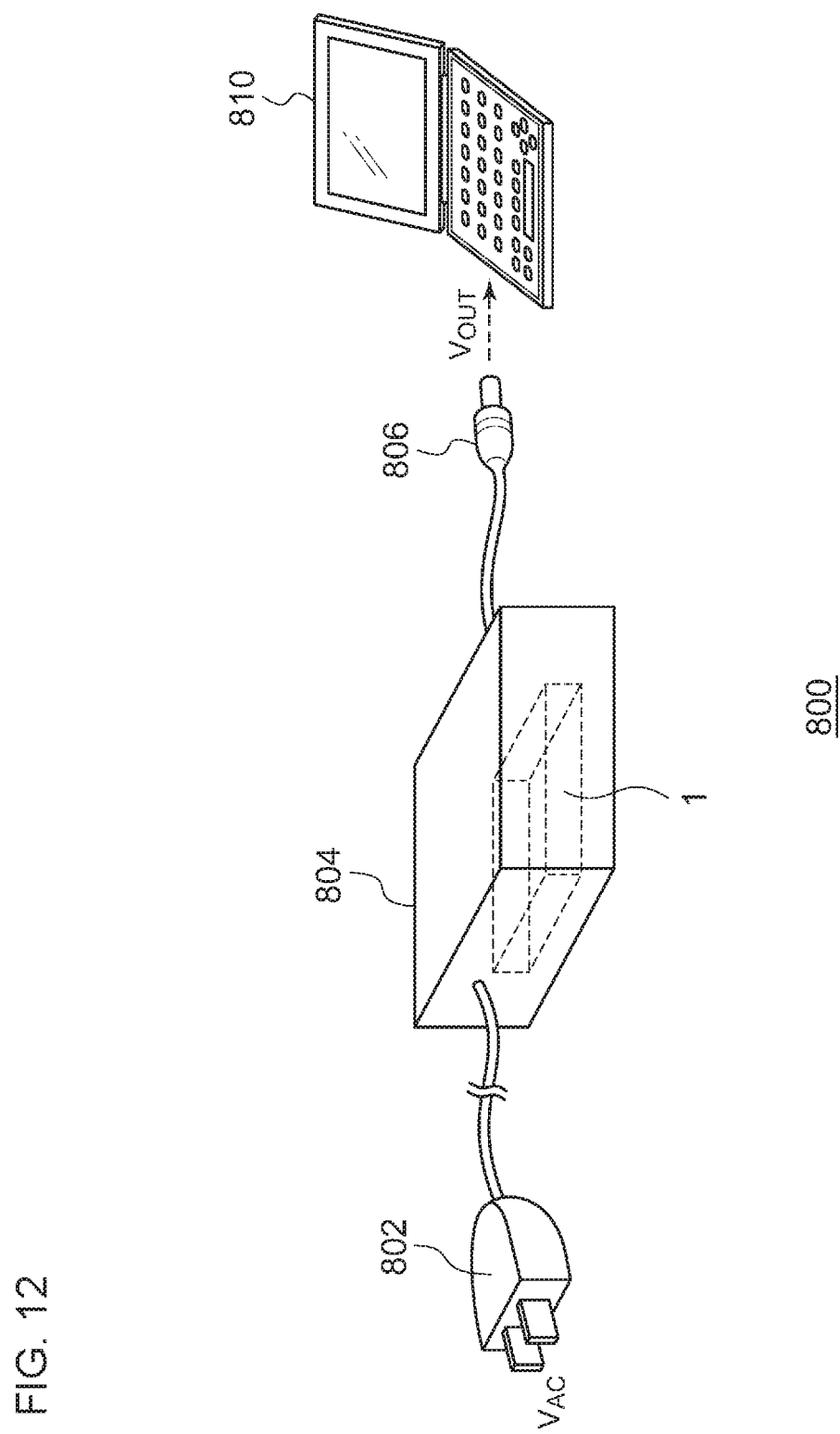
FIG. 12 is a diagram showing an AC adapter including an AC/DC converter.

FIG. 12 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop PCs, digital still cameras, digital video cameras, cellular phones, portable audio players, and the like.

Figure 13A:
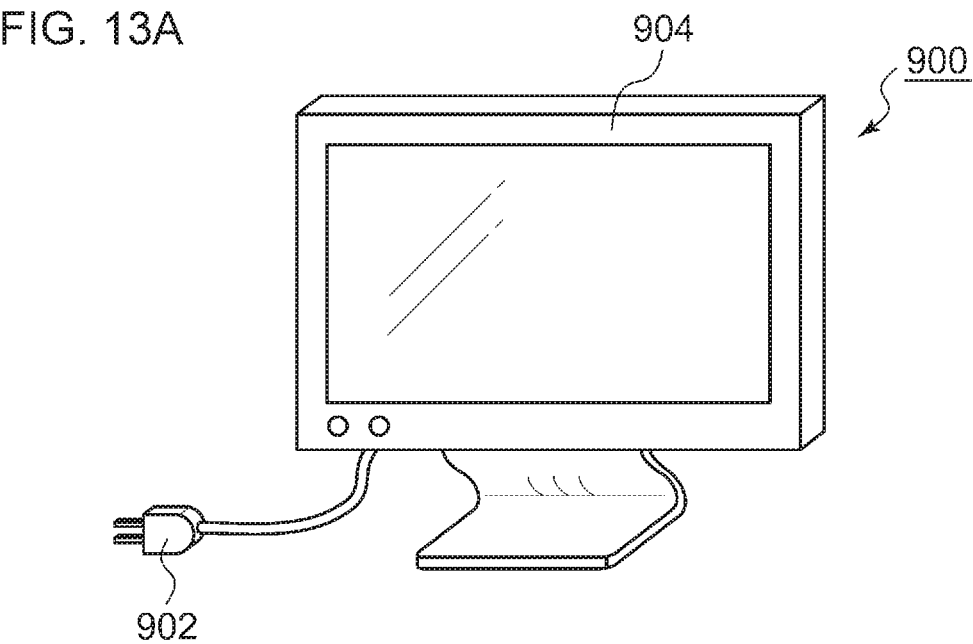
FIGS. 13A and 13B are diagrams each showing an electronic device including an AC/DC converter.
Figure 13B:
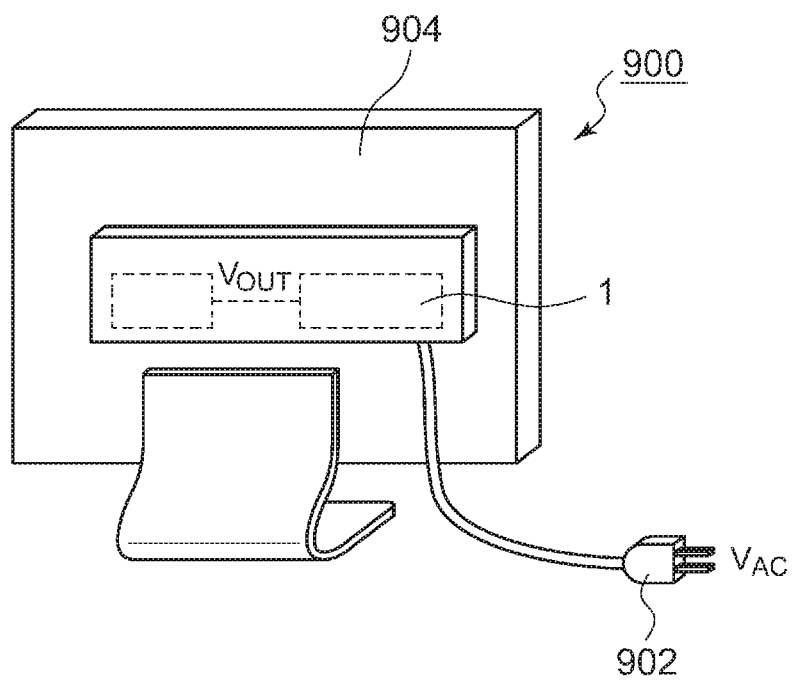

FIGS. 13A and 13B are diagrams each showing an electronic device 900 including the AC/DC converter 100. The electronic devices 900 shown in FIGS. 13A and 13B are each configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:
1. An insulated DC/DC converter comprising:
   a transformer comprising a primary winding and a secondary winding;
   a switching transistor and a sense resistor coupled in series between the primary winding of the transformer and a ground line;
   a rectifier element coupled to the secondary winding of the transformer;
   a photocoupler having a light-emitting element and a light-receiving element;
   a feedback circuit structured to drive the light-emitting element of the photocoupler such that an output voltage of the DC/DC converter approaches a target voltage;
   a primary-side controller comprising
      a feedback terminal coupled to the light-receiving element of the photocoupler and structured to receive a feedback signal from the photocoupler;
      a current detection terminal structured to receive a current detection signal that corresponds to a voltage drop across the sense resistor; and
      a current mode modulator structured to generate a pulse signal according to a voltage at the feedback terminal and a voltage at the current detection terminal, and structured to suspend a switching operation when the voltage at the feedback terminal is lower than a threshold value; and a burst mode adjustment circuit structured to shift the voltage at the current detection terminal according to an electrical state of the DC/DC converter.

2. The DC/DC converter according to claim 1, wherein the burst mode adjustment circuit is structured to shift the voltage at the current detection terminal according to a load state of the DC/DC converter.

3. The DC/DC converter according to claim 1, wherein the transformer further comprises an auxiliary winding, wherein the burst mode adjustment circuit comprises:
a diode having an anode coupled to the auxiliary winding; and
a capacitor coupled to a cathode of the diode,
and wherein the burst mode adjustment circuit is structured to shift the voltage at the current detection terminal based on a voltage across the capacitor.

4. The DC/DC converter according to claim 3, wherein the burst mode adjustment circuit further comprises:
a first resistor arranged between the cathode of the diode and the current detection terminal; and
a second resistor arranged between the current detection terminal and a connection node that couples the sense resistor and the switching transistor.

5. The DC/DC converter according to claim 4, wherein the burst mode adjustment circuit further comprises a first Zener diode coupled to the first resistor in series between the cathode of the diode and the current detection terminal.

6. The DC/DC converter according to claim 3, wherein the burst mode adjustment circuit further comprises a second Zener diode coupled in parallel with the capacitor.

7. The DC/DC converter according to claim 1, wherein the burst mode adjustment circuit is structured to shift the voltage at the current detection terminal according to an input voltage of the DC/DC converter.

8. The DC/DC converter according to claim 7, wherein the burst mode adjustment circuit comprises:
a third resistor arranged between an input terminal of the DC/DC converter and the current detection terminal;
a fourth resistor arranged between the current detection terminal and the ground line; and
a fifth resistor arranged between the current detection terminal and a connection node that couples the sense resistor and the switching transistor.

9. An electronic device comprising:
a load;
a diode rectifier circuit structured to perform full-wave rectification of a commercial AC voltage;
a smoothing capacitor structured to smooth an output voltage of the diode rectifier circuit, so as to generate a DC input voltage; and
the DC converter according to claim 1, structured to step down the DC input voltage, and to supply the voltage thus stepped down to the load.

10. A power supply adapter comprising:
a diode rectifier circuit structured to perform full-wave rectification of a commercial AC voltage;
a smoothing capacitor structured to smooth an output voltage of the diode rectifier circuit, so as to generate a DC input voltage; and
the DC converter according to claim 1, structured to step down the DC input voltage, and to supply the voltage thus stepped down to the load.

11. An insulated DC/DC converter comprising:
a transformer comprising a primary winding and a secondary winding;
a switching transistor and a sense resistor coupled in series between the primary winding of the transformer and a ground line;
a rectifier element coupled to the secondary winding of the transformer;
a photocoupler having a light-emitting element and a light-receiving element;
a feedback circuit structured to drive the light-emitting element of the photocoupler such that an output voltage of the DC/DC converter approaches a target voltage;
a primary-side controller comprising:
a feedback terminal coupled to the light-receiving element of the photocoupler and structured to receive a feedback signal from the photocoupler;
a current detection terminal structured to receive a current detection signal that corresponds to a voltage drop across the sense resistor; and
a current mode modulator structured to generate a control pulse based on a voltage at the feedback terminal and a voltage at the current detection terminal, and structured to be switchable between a normal mode and a burst mode; and
a burst mode adjustment circuit structured that, when an electrical state of the DC/DC converter satisfies a predetermined condition, a transition to the burst mode is inhibited, or otherwise a transition is forced from the burst mode to the normal mode.

12. The DC/DC converter according to claim 11, wherein the burst mode adjustment circuit is structured to shift the voltage at the current detection terminal according to the electrical state of the DC/DC converter.

13. The DC/DC converter according to claim 11, wherein the primary-side controller comprises a comparator structured to compare the voltage at the feedback terminal with a threshold voltage,
wherein, based on the comparison result, the current mode is structured to be switchable to the burst mode,
and wherein the burst mode adjustment circuit is structured to change the threshold voltage according to the electrical state of the DC/DC converter.

14. The DC/DC converter according to claim 11, wherein the electrical state of the DC/DC converter includes a load state of the DC/DC converter.

15. The DC/DC converter according to claim 11, wherein the electrical state of the DC/DC converter includes an input voltage of the DC/DC converter.

16. A control method for an insulated DC/DC converter, the control method comprising:
driving a light-emitting element of a photocoupler such that an output voltage of the DC/DC converter approaches a target voltage;
generating a current detection signal that corresponds to a current that flows through a switching transistor arranged on a primary side of the DC/DC converter;
generating a control pulse that is pulse width modulated in a current mode based on a feedback voltage that corresponds to a current that flows through a light-receiving element of the photocoupler and a voltage that corresponds to the current detection signal;
switching on and off the switching transistor according to the control pulse;
suspending the switching of the switching transistor when the feedback voltage is lower than a predetermined threshold value; and
shifting a voltage that corresponds to the current detection signal according to an electrical state of the DC/DC converter.

17. The control method according to claim 16, wherein the electrical state of the DC/DC converter includes a load state of the DC/DC converter.

18. The control method according to claim 16, wherein the electrical state of the DC/DC converter includes an input voltage of the DC/DC converter.

* * * * *